US008963006B2

(12) United States Patent
Kuwayama

(10) Patent No.: US 8,963,006 B2
(45) Date of Patent: Feb. 24, 2015

(54) PRESS-CLAMPING STRUCTURE FOR PRESS-CLAMPING ALUMINUM ELECTRIC WIRE TO TERMINAL

(75) Inventors: Yasumichi Kuwayama, Makinohara (JP); Goro Kuwayama, legal representative, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 211 days.

(21) Appl. No.: 12/742,989

(22) PCT Filed: Nov. 12, 2008

(86) PCT No.: PCT/JP2008/070966

§ 371 (c)(1),
(2), (4) Date: Nov. 5, 2010

(87) PCT Pub. No.: WO2009/064009

PCT Pub. Date: May 22, 2009

(65) Prior Publication Data

US 2011/0073365 A1 Mar. 31, 2011

(30) Foreign Application Priority Data

Nov. 16, 2007 (JP) ................................. 2007-298437

(51) Int. Cl.

| | |
|---|---|
| ***H01R 4/00*** | (2006.01) |
| ***H01R 4/62*** | (2006.01) |
| *H01R 4/18* | (2006.01) |
| *H02G 3/06* | (2006.01) |
| *H02G 15/08* | (2006.01) |
| *H01B 17/00* | (2006.01) |

(Continued)

(52) U.S. Cl.
CPC .................. *H01R 4/62* (2013.01); *H01R 4/185* (2013.01); *H01R 4/188* (2013.01); *H01R 13/04* (2013.01)
USPC ...... 174/84 C; 174/154; 174/72 A; 174/74 R; 174/93; 174/113 A; 439/421

(58) Field of Classification Search
USPC ......... 174/84 C, 154, 68.1, 72 A, 74 R, 75 R, 174/79, 90, 93, 113 A; 439/421, 423, 424; 14/22
See application file for complete search history.

(56) References Cited

U.S. PATENT DOCUMENTS 2,648,050 A * 8/1953 Berg ............................ 439/424
2,680,235 A * 6/1954 Pierce .......................... 439/423

(Continued)

FOREIGN PATENT DOCUMENTS

| | | |
|---|---|---|
| GB | 1 358 954 A | 7/1974 |
| JP | 2005-50736 A | 2/2005 |
| JP | 2005-174896 A | 6/2005 |

OTHER PUBLICATIONS

Communication issued on Jan. 18, 2012 by the Intellectual Property Office of the P.R. of China in the corresponding Chinese Patent Application No. 200880116452.9.

(Continued)

*Primary Examiner* — Hoa C Nguyen
*Assistant Examiner* — Binh Tran
(74) *Attorney, Agent, or Firm* — Sughrue Mion, PLLC

(57) ABSTRACT

A press-clamping structure includes: an aluminum electric wire having a conductor portion in which strands of aluminum or aluminum alloy are twisted; and a terminal which includes a bottom plate portion for placing the conductor portion thereon, and a pair of conductor caulking pieces which are provided consecutively to the bottom plate portion and are caulked to hold the conductor portion placed on the bottom plate portion. The conductor caulking pieces are bent so that distal end portions thereof are inserted into the conductor portion, to thereby embrace part of the strands of the conductor portion. At least one projection is formed on the bottom plate portion between the conductor caulking pieces. Outer surfaces of the respective distal end portions of the conductor caulking pieces are oriented towards the projection. The strands are partially held between the outer surfaces of the respective distal end portions and the projection.

5 Claims, 4 Drawing Sheets

(51) Int. Cl.

| | |
|---|---|
| *H01B 7/00* | (2006.01) |
| *H02G 3/04* | (2006.01) |
| *H01R 9/05* | (2006.01) |
| *H02G 15/04* | (2006.01) |
| *H02G 15/013* | (2006.01) |
| *H01B 5/08* | (2006.01) |
| *H01B 11/02* | (2006.01) |
| *H01R 4/24* | (2006.01) |
| *H01R 13/04* | (2006.01) |

(56) References Cited

U.S. PATENT DOCUMENTS

| | | | | |
|---|---|---|---|---|
| 3,831,132 | A * | 8/1974 | Bowden et al. | 439/442 |
| 3,878,318 | A | 4/1975 | Ziegler et al. | |
| 3,892,459 | A * | 7/1975 | Dittmann et al. | 439/442 |
| 4,720,273 | A * | 1/1988 | Thole | 439/592 |
| 5,666,723 | A * | 9/1997 | Ohtaka et al. | 29/874 |
| 7,306,495 | B2 * | 12/2007 | Hashimoto et al. | 439/877 |
| 2006/0021772 | A1 * | 2/2006 | Dellagala et al. | 174/27 |
| 2007/0178722 | A1 * | 8/2007 | Amidon et al. | 439/74 |

OTHER PUBLICATIONS

Office Action, dated May 14, 2014, issued by the State Intellectual Property Office of the People's Republic of China in counterpart Chinese Application No. 200880116452.9.

Notification of Reexamination dated Oct. 15, 2014, issued by the State Intellectual Property Office of the People's Republic of China in counterpart Chinese Application No. 200880116452.9.

* cited by examiner

PRESS-CLAMPING STRUCTURE FOR PRESS-CLAMPING ALUMINUM ELECTRIC WIRE TO TERMINAL

TECHNICAL FIELD

The present invention relates to a press-clamping structure for press-clamping an aluminum electric wire having a conductor portion where a plurality of strands of aluminum or aluminum alloy are twisted to a terminal.

BACKGROUND ART

In general, copper electric wires are used in wiring harnesses which are laid out on a vehicle such as an automotive vehicle. In connecting wiring harnesses or a wiring harness with onboard equipment, terminals are attached to the copper electric wires of the wiring harness, and terminals of this type are generally attached to the copper electric wires through press-clamping.

Typically, the terminal which is press-clamped to the copper electric wire includes a bottom plate portion on which a conductor portion of the copper electric wire which is made up of a plurality of twisted strands of copper is placed and a pair of conductor caulking pieces which are provided consecutively to the bottom plate portion for holding therebetween the conductor portion placed on the bottom plate portion. Then, the conductor caulking pieces are caulked to the conductor portion in such a manner that distal end portions of the conductor caulking pieces are inserted into the conductor portion, so as to produce a state in which the strands of the conductor portion are partially embraced by the conductor caulking pieces, whereby the terminal is securely press-clamped to the conductor portion of the copper electric wire.

In recent years, in consideration of weight reduction of vehicles and easiness of recycling as well as shortage of copper resources, aluminum electric wires have been collecting many people's attention. However, in an aluminum electric wire when compared with copper, an oxide layer formed on an aluminum surface becomes thick, and there is a tendency of contact resistance between a conductor portion and a terminal becoming relatively high. As a means for reducing the contact resistance, there has been known a method in which respective conductor caulking pieces of a terminal are caulked strongly to the conductor portion so as to increase the compressibility factor of the conductor portion. According to this method, oxide layers on the respective strands making up the conductor portion are broken, whereby the contact resistance between the conductor portion and the terminal is reduced. Note that when used in this specification, the compressibility factor of the conductor portion is regulated as a ratio of a sectional area of the conductor portion before press-clamping to a sectional area of the conductor portion after press-clamping.

However, stress applied to the conductor portion increases as the compressibility factor of the conductor portion increases. In addition, aluminum is inferior in mechanical strength to copper, and in the aluminum electric wire, when too large stress is laid on the conductor portion, the press-clamping strength of the terminal is deteriorated remarkably. Then, in press-clamping between an aluminum electric wire and a terminal, there have been proposed various press-clamping structure for press-clamping between an aluminum electric wire and a terminal for the purpose of making the reduction in contact resistance between the aluminum electric wire and the terminal with ensuring the press-clamping strength of the terminal (for example, refer to Patent Documents 1 and 2).

In a press-clamping structure disclosed in Patent Document 1, a compressibility factor which can obtain compatibility between reduction in contact resistance between a conductor portion of an aluminum electric wire and a terminal and ensuring press-clamping strength of the terminal is regulated in accordance with a sectional area of the conductor portion. For example, a compressibility factor of a conductor portion whose sectional area is less than 1.5 $mm^2$ is referred to as 50 to 70%, while a compressibility factor of a conductor portion whose sectional area is equal to or more than 1.5 $mm^2$ is referred to as 40 to 70%. In addition, a compressibility factor of a conductor portion in press-clamping of a copper electric wire to a terminal is typically referred to as 75 to 95%.

In a press-clamping structure disclosed in Patent Document 2, as is shown in FIGS. 5A and 5B, there are provided two pairs of caulking pieces (barrels) that are to be caulked on to a conductor portion 202 of an aluminum electric wire 201. In addition, holding caulking pieces 203 and electricity conducting caulking pieces 204 are caulked on to the conductor portion 202 by the use of a caulking tool in which a difference in level is provided in such a manner that the holding caulking pieces 203 which are situated on a proximal end side of the conductor portion 202 become higher than the electricity conducting caulking pieces 204 which are situated on a distal end side of the conductor portion 202 in such a state that both the caulking pieces are so caulked. By this configuration, a compressibility of the conductor portion 202 by the holding caulking pieces 203 is made to be substantially the same as a compressibility of a conductor portion of a copper electric wire in press-clamping of a terminal to the copper electric wire so as to ensure press-clamping strength while a compressibility factor of the conductor portion 202 by the electricity conducting caulking pieces 204 is made to be relatively high so as to reduce contact resistance.

[Patent Document 1] JP-A-2005-174896

[Patent Document 2] JP-A-2005-50736

In the press-clamping structure disclosed in Patent Document 1, the compressibility factor of the conductor portion is increased overall, compared with the case of copper wire, and hence, it is inevitable that the press-clamping strength is reduced. In contrast to this, in the press-clamping structure disclosed in Patent Document 2, the compressibility factor of the conductor portion can be made to differ between the location where the holding caulking pieces are caulked and the location where the electricity conducting caulking pieces are caulked, whereby the compressibility factor of the conductor portion in the location where the holding caulking pieces are caulked is made to be substantially the same as that of copper wire, so as to avoid the reduction in press-clamping strength of the terminal. However, in the press-clamping structure disclosed in Patent Document 2, the special caulking tool is necessary to caulk both the caulking pieces to the conductor portion in such a manner that the electricity conducting caulking pieces differs in height from the holding caulking pieces, and additionally, the heights at the two locations of the electricity conducting caulking pieces and the holding caulking pieces need to be managed, and to do this, costs have to be incurred exclusively.

In addition, it is generally understood that spring back is produced in the caulking pieces which are caulked on to the conductor portion. In the press-clamping structures disclosed in Patent Documents 1 and 2, the distal end portions of the caulking pieces are inserted into the conductor portion in such a manner that their projecting end faces are oriented towards the bottom plate portion. In the case of the caulking pieces which are caulked in the way described therein, the distal end portions are easily dislocated from the conductor portion, and spring back is easily produced. In addition, in the case of the conductor portion of the aluminum electric wire, aluminum which constitutes the respective strands is easier to produce stress relaxation than copper, and even in the event that spring back is produced in the caulking pieces to reduce the stress, it is difficult for them to restore the original positions. Due to this, a gap is produced between the caulking pieces and the conductor portion, whereby there is caused a risk that desired contact resistance and press-clamping strength cannot be obtained.

DISCLOSURE OF INVENTION

The invention has been made in view of the situations and an object thereof is to provide a press-clamping structure for press-clamping an aluminum electric wire to a terminal which can establish compatibility between reduction in contact resistance between a conductor portion of an aluminum electric wire and a terminal and ensuring press-clamping strength of the terminal with ease and in an ensured fashion.

The object will be attained by a press-clamping structure for press-clamping between an aluminum electric wire and a terminal which will be described under (1) to (3) as below.

(1) A press-clamping structure, including: an aluminum electric wire having a conductor portion in which a plurality of strands of aluminum or aluminum alloy are twisted; and a terminal which includes a bottom plate portion for placing the conductor portion thereon, and a pair of conductor caulking pieces which are provided consecutively to the bottom plate portion and are caulked to hold the conductor portion placed on the bottom plate portion, wherein the conductor caulking pieces are bent so that distal end portions of the conductor caulking pieces are inserted into the conductor portion, to thereby embrace part of the strands of the conductor portion, wherein at least one projection is formed on the bottom plate portion between the conductor caulking pieces, wherein outer surfaces of the respective distal end portions of the conductor caulking pieces are oriented towards the projection, and wherein the strands of the conductor portion are partially held between the outer surfaces of the respective distal end portions of the conductor caulking pieces and the projection.

(2) The press-clamping structure according to (1), wherein the projection has a sharp edge in an opposed position for facing the outer surface of the distal end portion of the conductor caulking piece.

(3) The press-clamping structure according to (1) or (2), wherein a height of the projection is made to gradually increase from a proximal end side to a distal end side of the conductor portion.

According to the press-clamping structure set forth under (1), the strands of the conductor portion are partially held between the outer surfaces of the respective distal end portions of the conductor caulking pieces and the projection on the bottom plate portion. These strands are rubbed by the outer surfaces of the distal end portions of the conductor caulking pieces and the projection on the bottom plate portion when the conductor caulking pieces are caulked on to the conductor portion, and oxide layers formed on the surfaces of the strands are removed. By this action, the contact resistance between the conductor portion and the terminal can be reduced without increasing the compressibility factor of the conductor portion, so that the compressibility factor of the conductor portion can be made to be substantially the same as that of copper electric wire to thereby ensure the press-clamping strength of the terminal. In addition, the distal end portions of the conductor caulking pieces are inserted deeper into the conductor portion as the outer surfaces of the distal end portions of the conductor caulking pieces are oriented more towards the projection on the bottom plate portion, and this increases the contact area between the conductor caulking pieces and the conductor portion. By this configuration, stable electric conductivity can be obtained between the conductor portion and the terminal. Furthermore, friction is applied to the distal end portions of the conductor caulking pieces as a result of contact with the strands which are held in between the projection on the bottom plate portion and the distal end portions so inserted into the conductor portion. By the action of friction so applied, spring back in the conductor caulking pieces can be suppressed, whereby it becomes possible to maintain the contact resistance between the conductor portion and the terminal and the press-clamping strength of the terminal.

According to the configuration of the press-clamping structure described under (2), the removing effect of the oxide layers on the strands can be enhanced.

According to the configuration of the press-clamping structure described under (3), the compressibility factor of the conductor portion is gradually increased from the proximal end side to the distal end side, whereby the press-clamping strength is ensured on the proximal end side of the conductor portion, so as to avoid the application of load to the distal end side of the conductor portion where the contact resistance between the conductor portion and the terminal is reduced.

According to the press-clamping structure for press-clamping an aluminum electric wire to a terminal, the reduction in contact resistance between the aluminum electric wire and the terminal and ensuring the press-clamping strength of the terminal can easily be made compatible with each other.

BEST MODE FOR CARRYING OUT THE INVENTION

Hereinafter, preferred embodiments of a press-clamping structure for press-clamping an aluminum electric wire to a terminal will be described in detail based on the drawings.

(First Embodiment)

Figure 1:
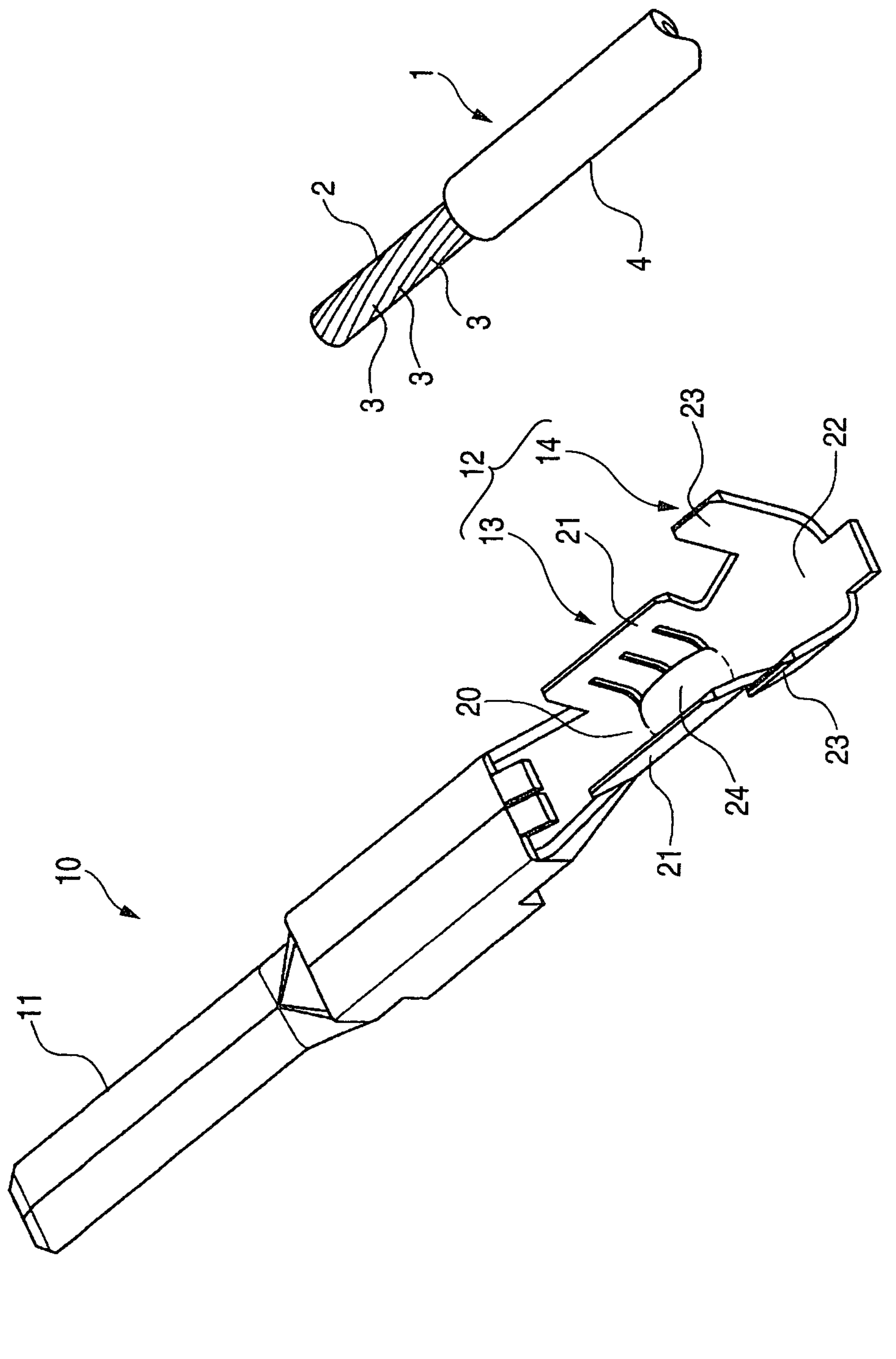
FIG. 1 is an exploded perspective view of an aluminum electric wire and a terminal which are used in a first embodiment of a press-clamping structure for press-clamping an aluminum electric wire to a terminal of the invention.
Figure 2:
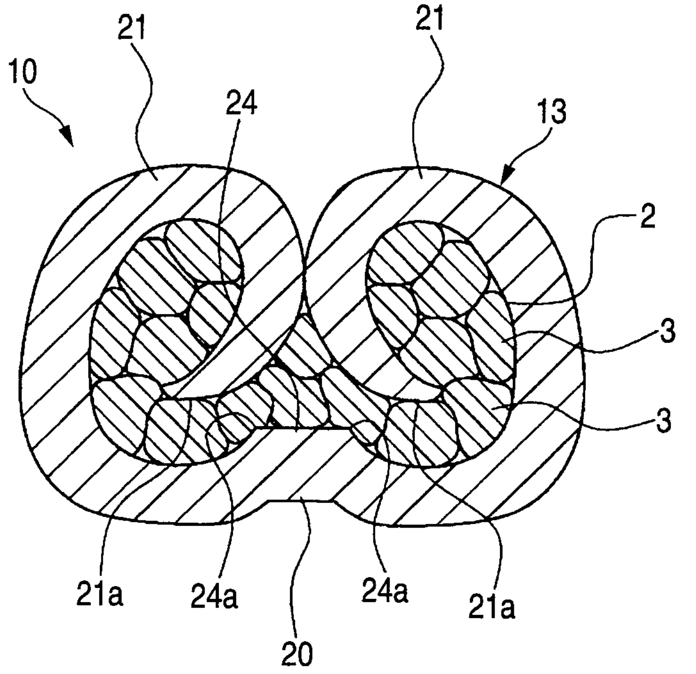
FIG. 2 is a sectional view of the press-clamping structure shown in FIG. 1.

FIG. 1 is an exploded perspective view of an aluminum electric wire and a terminal which are used in a first embodiment of a press-clamping structure for press-clamping an aluminum electric wire to a terminal of the invention, and FIG. 2 is a sectional view of the press-clamping structure shown in FIG. 1.

As is shown in FIG. 1, an aluminum electric wire 1 has a conductor portion 2 where a plurality of strands 3 of aluminum or aluminum alloy are twisted, and an outer circumference of the conductor portion 2 is covered with a sheath 4 formed from an insulation material. In the aluminum electric wire 1, the sheath 4 is removed over a predetermined length at its terminating end portion so as to expose the conductor portion 2, and a terminal 10 is connected to the terminating end portion through press-clamping. In addition, as a preferred specific example of an aluminum alloy, an alloy of aluminum and iron can be raised. In the case of this alloy being adopted, compared with a conductor of aluminum, the aluminum and iron alloy is easy to be elongated and strength (in particular, tensile strength) can be increased.

The terminal 10 has a connecting portion 11 with a mating terminal (not shown) which is provided at a distal end portion and a holding portion 12 for holding the aluminum electric wire 1 which is provided at a proximal end portion thereof. Furthermore, the holding portion 12 has a conductor holding portion 13 for holding the conductor portion 2 of the aluminum electric wire 1 which is provided on a proximal end side, and a sheath holding portion 14 for holding the sheath 4 which is provided on a proximal end side thereof.

The conductor holding portion 13 includes a bottom plate portion 20 for placing the conductor portion 2 thereon which is exposed at the terminating end portion of the aluminum electric wire 1 and a pair of conductor caulking pieces 21 which are provided consecutively to the bottom plate portion 20 for holding therebetween the conductor portion 2 which is placed on the bottom plate portion 20. These conductor caulking pieces 21 are formed into a substantially U-shape on a section which is normal to an axial direction of the conductor portion 2 placed on the bottom plate portion 20.

The sheath holding portion 14 includes a bottom plate portion 22 on which the sheath 4 at the terminating end portion of the aluminum electric wire 1 is placed and a pair of sheath caulking pieces 23 which are provided consecutively to the bottom plate portion 22 for holding therebetween the sheath 4 placed on the bottom plate portion 22. The sheath holding portion 14 is, as with the conductor holding portion 13, formed into a substantially U-shape in section. In addition, the bottom plate portion 22 of the sheath holding portion 14 is provided consecutively to a proximal end of the bottom plate portion 20 of the conductor holding portion 13.

One projection 24 is formed on the bottom plate portion 20 of the conductor holding portion 13 at a central portion between the pair of conductor caulking pieces 21. The projection 24 is formed, for example, by hammering a conductive sheet metal of copper alloy which forms the bottom plate portion 20. In addition, this projection 24 is provided over the area of the bottom plate portion 20 which extends over substantially the overall width of or interval between the conductor caulking pieces 21. Note that a plurality of projections may be provided in series along the axial direction over the area of the bottom plate portion 20 which extends over substantially the overall width of or interval between the conductor caulking pieces 21.

The terminal 10 is connected to the electric wire 1 through press-clamping by caulking the pair of conductor caulking pieces 21 of the conductor holding portion 13 on to the conductor portion 2 of the aluminum electric wire 1 placed on the bottom plate portion 20 of the conductor holding portion 13 and caulking the pair of sheath caulking pieces 23 of the sheath holding portion 14 on to the sheath 4 of the aluminum electric wire 1 placed on the bottom plate portion 22 of the sheath holding portion 14.

As is shown in FIG. 2, the pair of conductor caulking pieces 21 are caulked on to the conductor portion 2 substantially symmetrical with respect to a plane which includes the axis of the conductor portion 2 and which is substantially normal to the bottom plate portion 20. More specifically, the pair of conductor caulking pieces 21 are bent in such a manner that distal end portions thereof are inserted into the conductor portion 2 individually, whereby the pair of conductor caulking pieces 21 are caulked on to the conductor portion 2 in such a state that the strands 3 of the conductor portion 2 are partially embraced by the distal end portions so inserted. The compressibility factor of the conductor portion 2 where the piece of conductor caulking pieces 21 is caulked is referred to as 50 to 90%. In addition, there is imposed no specific limitation on the form of the pair of sheath caulking pieces 23. For example, distal end portions of the respective sheath caulking pieces 23 may be made to bite into the sheath 4 or the distal end portion may only have to be wound round an outer circumference of the sheath 4.

Outer surfaces 21*a* of the curled distal end portions of the respective conductor caulking pieces 21 which are inserted into the conductor portion 2 are oriented towards the projection 24 of the bottom plate portion 20. Namely, the respective conductor caulking pieces 21 of the embodiment are formed longer than the caulking pieces of the known press-clamping structures in which the projecting end faces of the distal end portions of the caulking pieces are oriented towards the bottom plate portion and are caulked in such a manner as to be wound. In addition, the strands 3 of the conductor portion 2 are partially held in between the outer surfaces 21*a* of the respective distal end portions of the conductor caulking pieces 21 and the projection 24 of the bottom plate portion 20 to be compressed.

Some (part) of the strands 3 of the conductor portion 2 which are held in between the outer surfaces 21*a* of the distal end portions of the respective conductor caulking pieces 21 and the projection 24 of the bottom plate portion 20 are rubbed on their surfaces by the outer surfaces 21*a* of the distal end portions of the conductor caulking pieces 21 and the projection 24 of the bottom plate portion 20 during the process of the conductor caulking pieces 21 being caulked on to the conductor portion 2. By this rubbing action, oxide layers formed on the surfaces of the strands 3 in question are removed so as to expose their basic material of aluminum or aluminum alloy, whereby good electric conductivity is ensured between the conductor portion 2 and the terminal 10.

Preferably, a sharp edge 24*a* is provided on the projection 24 in an opposite position for facing the outer surfaces 21*a* of the distal end portions of the respective conductor caulking pieces 21. The oxide layers formed on the surfaces of the strands 3 can be cut off by the edges 24*a*, whereby the oxide layers on the surfaces of the strands 3 can be removed in a more ensured fashion.

In addition, by some of the strands 3 of the conductor portion 2 being held in between the outer surfaces 21*a* of the distal end portions of the respective conductor caulking pieces 21 and the projection 24 of the bottom plate portion 20 to be compressed, friction is produced between the respective conductor caulking pieces 21 and the strands 3. The friction so produced functions to prevent the dislocation of the distal end portions of the respective conductor caulking pieces 21 from the conductor portion 2.

According to the press-clamping structure of the embodiment for press-clamping the aluminum electric wire 1 to the terminal 10, some of the strands 3 of the conductor portion 2 are held in between the outer surfaces 21*a* of the distal end portions of the conductor caulking pieces 21 and the projection 24 on the bottom plate portion 20. These strands 3 are rubbed by the outer surfaces 21*a* of the distal end portions of the conductor caulking pieces 21 and the projection 24 on the bottom plate portion 20 when the conductor caulking pieces 21 are caulked on to the conductor portion 2, and the oxide layers formed on the surfaces of the strands 3 are removed. By this action, the contact resistance between the conductor portion 2 and the terminal 10 can be reduced without increasing the compressibility factor of the conductor portion 2, so that the compressibility factor of the conductor portion 2 can be made to be substantially the same as that of copper electric wire to thereby ensure the press-clamping strength of the terminal 10. In addition, the distal end portions of the conductor caulking pieces 21 are inserted deeper into the conductor portion 2 as the outer surfaces 21*a* of the distal end portions of the conductor caulking pieces 21 are oriented more towards the projection 24 on the bottom plate portion 20, and this increases the contact area between the conductor caulking pieces 21 and the conductor portion 2. By this configuration, stable electric conductivity can be obtained between the conductor portion 2 and the terminal 10. Furthermore, friction is applied to the distal end portions of the conductor caulking pieces 21 as a result of contact with the strands 3 which are held in between the projection 24 on the bottom plate portion 20 and the distal end portions so inserted into the conductor portion 2. By the action of friction so applied, spring back in the conductor caulking pieces 21 can be suppressed, whereby it becomes possible to maintain the contact resistance between the conductor portion 2 and the terminal 10 and the press-clamping strength of the terminal 10.

Furthermore, according to the press-clamping structure of the embodiment for press-clamping the aluminum electric wire 1 to the terminal 10, the sharp edges are provided in the locations on the projection 24 which oppositely face the outer surfaces 21*a* of the distal end portions of the respective conductor caulking pieces 21, and the edges 24*a* so formed can enhance the oxide layer removing effect of removing the oxide layers on the strands 3 by the edges 24*a*.

(Embodiment 2)

Figure 3:
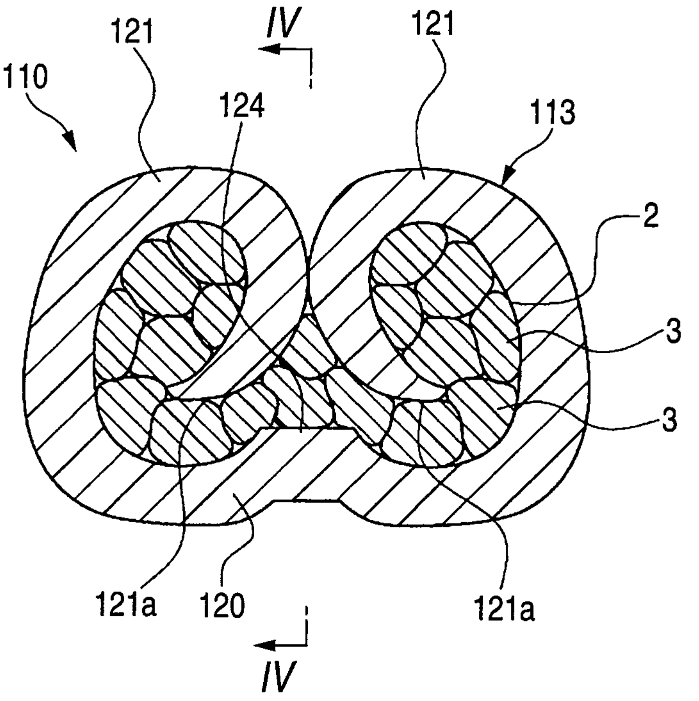
FIG. 3 is a sectional view of a second embodiment of a press-clamping structure for press-clamping an aluminum electric wire to a terminal.
Figure 4:
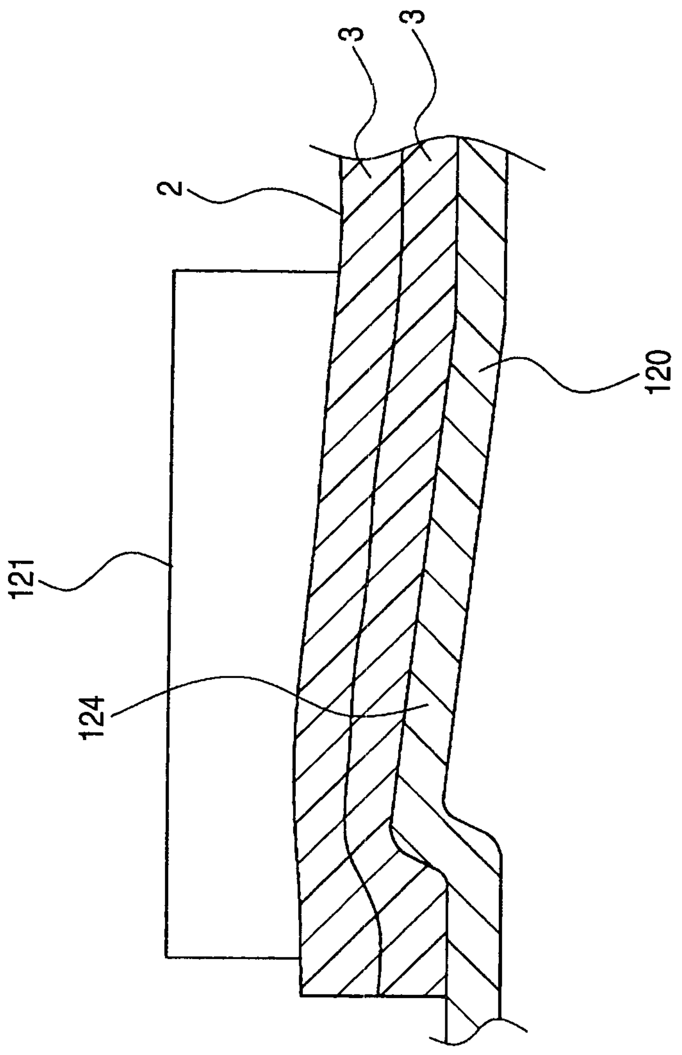
FIG. 4 is a sectional view taken along the line IV-IV in FIG. 3.
Figure 5A:
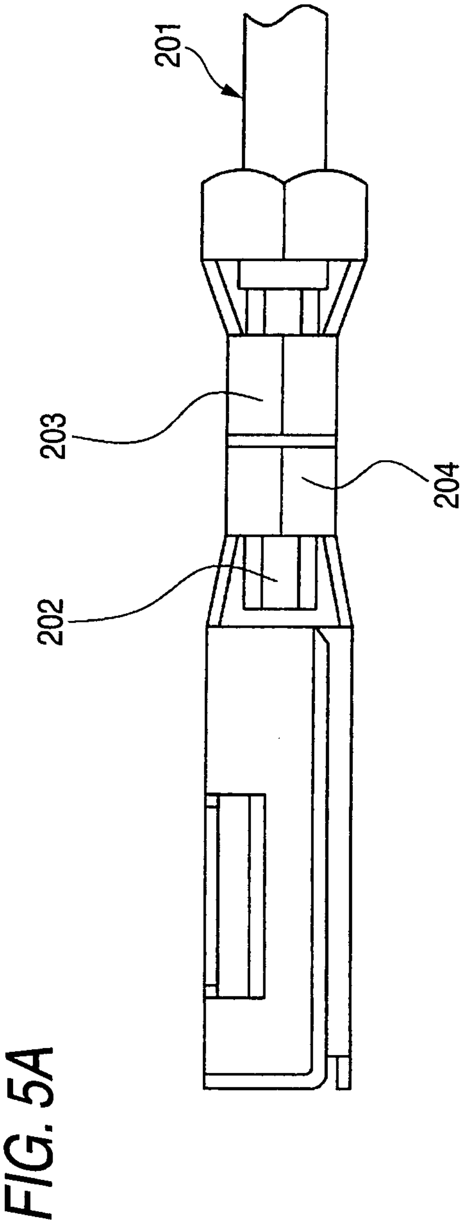
FIG. 5A is a plan view showing a known press-clamping structure for press-clamping an aluminum electric wire and a terminal.
Figure 5B:
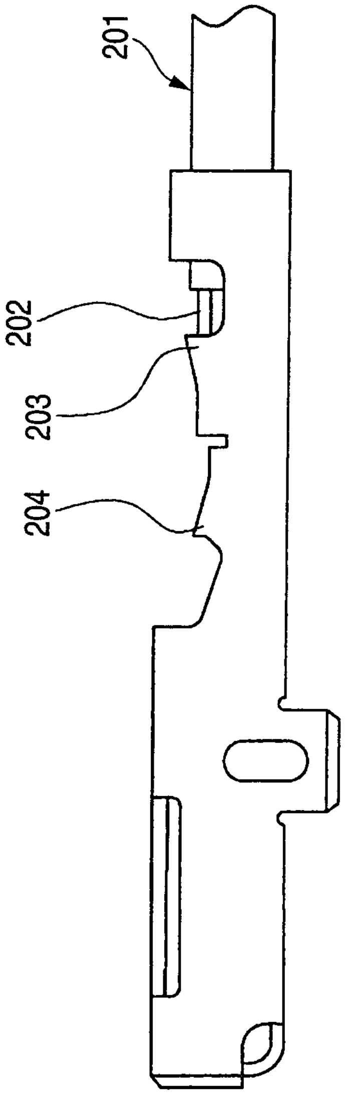
FIG. 5B is a side view of the press-clamping structure shown in FIG. 5A.

FIG. 3 is a sectional view of a second embodiment of a press-clamping structure for press-clamping an aluminum electric wire to a terminal, and FIG. 4 is a sectional view taken along the line IV-IV in FIG. 3. In the figures, same reference numerals are imparted to similar members in terms of function to those of the press-clamping structure for press-clamping an aluminum electric wire to a terminal of the first embodiment, so as to omit the repeated description of the same features.

As is shown in FIG. 3, in the press-clamping structure of this embodiment, a terminal 110 is connected to a terminating end portion of an aluminum electric wire 1 through press-clamping. The terminal 10 has a connecting portion with a mating terminal which is provided at a distal end portion and a holding portion for holding the aluminum electric wire 1 which is provided at a proximal end portion thereof. Furthermore, the holding portion has a conductor holding portion 113 for holding the conductor portion 2 of the aluminum electric wire 1 which is provided on a distal end side and a sheath holding portion for holding a sheath of the aluminum electric wire on a proximal end side thereof. The configuration of the sheath holding portion is similar to that of the sheath holding portion of the terminal 10 of the press-clamping structure of the first embodiment that has been described above, and therefore, the description thereof will be omitted here.

The conductor holding portion 113 includes a bottom plate portion 120 for placing the conductor portion 2 thereon which is exposed at the terminating end portion of the aluminum electric wire 1 and a pair of conductor caulking pieces 121 which are provided consecutively to the bottom plate portion 120 for holding therebetween the conductor portion 2 which is placed on the bottom plate portion 120. These conductor caulking pieces 121 are formed into a substantially U-shape on a section which is normal to an axial direction of the conductor portion 2 placed on the bottom plate portion 120.

One projection 124 is formed on the bottom plate portion 120 of the conductor holding portion 113 at a central portion between the pair of conductor caulking pieces 121. The projection 124 is provided over the area of the bottom plate portion 120 which extends over substantially the overall width of or interval between the conductor caulking pieces 121, and as is shown in FIG. 4, the height of the projection 124 is made to increase gradually from a proximal end side to a distal end side of the conductor portion 2.

The pair of conductor caulking pieces 121 are caulked on to the conductor portion 2 substantially symmetrical with respect to a plane which includes the axis of the conductor portion 2 and which is substantially normal to the bottom plate portion 120. More specifically, the pair of conductor caulking pieces 121 are bent in such a manner that distal end portions thereof are inserted into the conductor portion 2 individually, whereby the pair of conductor caulking pieces 121 are caulked on to the conductor portion 2 in such a state that some of the strands 3 of the conductor portion 2 are embraced by the distal end portions so inserted.

By the projection 124 of the bottom plate portion 120 being made to gradually increase in height from the proximal end side to the distal end side, the compressibility factor of the conductor portion 2 in an area close to the proximal end side is made to be relatively low, while in an area close to the distal end side of the projection the compressibility factor of the conductor portion 2 is made to be relatively high. The press-clamping strength of the terminal 110 is ensured in the area where the compressibility factor of the conductor portion 2 is relatively low, and in the area where the compressibility factor of the conductor portion 2 is relatively high, the contact resistance between the conductor portion 2 and the terminal 110 is reduced. By the area where the press-clamping strength is ensured being situated on the proximal end side, a risk is avoided that load produced by pulling the aluminum electric wire is applied to the area on the distal end side where the contact resistance between the conductor portion 2 and the terminal 110 is reduced.

Outer surfaces 121*a* of the curled distal end portions of the respective conductor caulking pieces 121 which are inserted into the conductor portion 2 are oriented towards the projection 124 of the bottom plate portion 120. In addition, the strands 3 of the conductor portion 2 are partially held in between the outer surfaces 121*a* of the distal end portions of the respective conductor caulking pieces 121 and the projection 124 of the bottom plate portion 120 to be compressed.

Some (part) of the strands 3 of the conductor portion 2 which are held in between the outer surfaces 121*a* and the projection 124 of the bottom plate portion 120 of the distal end portions of the respective conductor caulking pieces 121 are rubbed on their surfaces by the outer surfaces 121*a* of the distal end portions of the conductor caulking pieces 121 and the projection 124 of the bottom plate portion 120 during the process of the conductor caulking pieces 121 being caulked on to the conductor portion 2. By this rubbing action, oxide layers formed on the surfaces of the strands 3 in question are removed so as to expose their basic material of aluminum or aluminum alloy, whereby good electricity conduction is ensured between the conductor portion 2 and the terminal 110.

In addition, by some of the strands 3 of the conductor portion 2 being held in between the outer surfaces 121*a* of the distal end portions of the respective conductor caulking pieces 121 and the projection 124 of the bottom plate portion 120 to be compressed, friction is produced between the respective conductor caulking pieces 121 and the strands 3. The friction so produced functions to prevent the dislocation of the distal end portions of the respective conductor caulking pieces 121 from the conductor portion 2.

Thus, as is described heretofore, according to the press-clamping structure of the second embodiment for press-clamping the aluminum electric wire 1 to the terminal 110, some of the strands 3 of the conductor portion 2 are held in between the outer surfaces 121*a* of the distal end portions of the conductor caulking pieces 121 and the projection 124 on the bottom plate portion 120. These strands 3 are rubbed by the outer surfaces 121*a* of the distal end portions of the conductor caulking pieces 121 and the projection 124 on the bottom plate portion 120 when the conductor caulking pieces 121 are caulked on to the conductor portion 2, and the oxide layers formed on the surfaces of the strands 3 are removed. By this action, the contact resistance between the conductor portion 2 and the terminal 110 can be reduced without increasing the compressibility factor of the conductor portion 2, so that the compressibility factor of the conductor portion 2 can be made to be substantially the same as that of copper electric wire to thereby ensure the press-clamping strength of the terminal 110. In addition, the distal end portions of the conductor caulking pieces 121 are inserted deeper into the conductor portion 2 as the outer surfaces 121*a* of the distal end portions of the conductor caulking pieces 121 are oriented more towards the projection 124 on the bottom plate portion 120, and this increases the contact area between the conductor caulking pieces 121 and the conductor portion 2. By this configuration, stable electric conductivity can be obtained between the conductor portion 2 and the terminal 110. Furthermore, friction is applied to the distal end portions of the conductor caulking pieces 121 as a result of contact with the strands 3 which are held in between the projection 124 on the bottom plate portion 120 and the distal end portions so inserted into the conductor portion 2. By the action of friction so applied, spring back in the conductor caulking pieces 121 can be suppressed, whereby it becomes possible to maintain the contact resistance between the conductor portion 2 and the terminal 110 and the press-clamping strength of the terminal 110.

Furthermore, according to the press-clamping structure of the embodiment for press-clamping the aluminum electric wire 1 to the terminal 110, the height of the projection 124 of the bottom plate portion 120 is made to increase gradually from the proximal end side to the proximal end side, whereby the compressibility factor of the conductor portion 2 is made to increase gradually from the distal end side to the distal end side. By this configuration, the press-clamping strength of the terminal 110 is ensured on the proximal end side of the conductor portion 2 and a risk can be avoided that load is applied to the distal end side of the conductor where the contact resistance between the conductor portion 2 and the terminal 110 is reduced.

In addition, the invention is not limited to the embodiments that is described above, and hence, the invention can be modified and/or improved as required. In addition to this, the shapes, dimensions, numeric values, forms, number, locations and the like of the respective constituent elements which are described in the embodiments are arbitrary and limited in no way, provided the invention can be attained.

INDUSTRIAL APPLICABILITY

According to the present invention, it is utilized as a press-clamping structure for press-clamping an aluminum electric wire having a conductor portion where a plurality of strands of aluminum or aluminum alloy are twisted to a terminal.

The invention claimed is:

1. A press-clamping structure, comprising:

an aluminum electric wire having a conductor portion in which a plurality of strands of aluminum or aluminum alloy are twisted; and a terminal which includes a bottom plate portion for placing the conductor portion thereon, and a pair of conductor caulking pieces which are provided consecutively to the bottom plate portion and are caulked to hold, and electrically connect to, the conductor portion placed on the bottom plate portion, wherein at least one projection is formed on the bottom plate portion between the conductor caulking pieces wherein the conductor caulking pieces are bent so that distal end portions of the conductor caulking pieces are inserted between the plurality of strands of the conductor portion, to thereby embrace part of the strands of the conductor portion to provide electrical contact therebetween and so that respective surfaces of the distal end portions are oriented towards the projection, said surfaces being defined as outer surfaces, and wherein the strands of the conductor portion are partially held between the outer surfaces of the respective distal end portions of the conductor caulking pieces and the projection, the projection includes a substantially upwardly facing surface and that the strands are held between the outer surfaces of the conductor calking pieces and upwardly facing surface of the projection, wherein the projection has at least one sharp edge in an opposed position to the outer surface of the distal end portion of the conductor caulking piece, the at least one sham edge is capable of cutting into the aluminum electric wire to remove an oxide layer from the aluminum electric wire, a height of the projection is made to gradually increase from a proximal end side toward a distal end side of the conductor portion such that the height of the projection is made to increase from the proximal end side to middle part of the projection, and the height of the projection is made to decrease from the middle part of the projection to the distal end side of the conductor portion, wherein a rate of the decrease is greater than a rate of the increase, and wherein the outer surfaces of the conductor caulking pieces contact in a range between opposite lateral edges of the projection, edges of the distal end portions of the conductor caulking pieces are bent and extended at least outside the range between the opposite lateral edges of the projection.

2. The press-clamping structure as set forth in claim 1, wherein the conductor caulking pieces contact the conductor portion of the wire substantially along an entire length of the caulking pieces.

3. The press-clamping structure as set forth in claim 1, wherein at least a strand of the conductor portion is partially held between each of the outer surfaces of the respective distal end portions of the conductor caulking pieces, and wherein the at least one sharp edge is cut into another strand of the conductor portion.

4. The press-clamping structure as set forth in claim 1, wherein the sharp edge is provided along a lateral edge of the projection.

5. The press-clamping structure as set forth in claim 4, wherein the at least one sharp edge includes a pair of sharp edges each in opposed positions to the outer surfaces of the distal end portions of the conductor caulking pieces and provided along lateral edges of the projection.

* * * * *